United States Patent [19] — [11] 3,777,066
Nicholas — [45] Dec. 4, 1973

[54] METHOD AND SYSTEM FOR SYNCHRONIZING THE TRANSMISSION OF DIGITAL DATA WHILE PROVIDING VARIABLE LENGTH FILLER CODE

[75] Inventor: David C. Nicholas, Cedar Rapids, Iowa

[73] Assignee: Iowa State University Research Foundation, Ames, Iowa

[22] Filed: Jan. 13, 1972

[21] Appl. No.: 217,612

[52] U.S. Cl. ........ 179/69.5 R, 325/38 R, 325/38 B, 178/68

[51] Int. Cl. .............................................. H04m 5/10

[58] Field of Search .................. 178/68; 179/69.5 R, 179/15 BS, 15 AF, 15 BV; 340/146.1 D, 347 DD, 172.5; 235/154; 325/38 R, 38 B

[56] References Cited

UNITED STATES PATENTS

| | | | |
|---|---|---|---|
| 3,156,768 | 11/1964 | Wagner | 178/69.5 R X |
| 3,646,445 | 2/1972 | Reindl | 179/15 AF X |
| 3,420,956 | 1/1969 | Heightley et al. | 178/69.5 R X |
| 3,668,645 | 6/1972 | Reymond et al. | 179/15 AF X |
| 3,680,051 | 7/1972 | Blessin et al. | 179/15 AF X |
| 3,504,287 | 3/1970 | Deregnaucourt | 179/15 AF |
| 3,651,263 | 3/1972 | Lindback et al. | 178/69.5 R |
| 3,351,919 | 11/1967 | Milford | 179/15 AF X |

*Primary Examiner*—Charles D. Miller
*Attorney*—James J. Hill

[57] ABSTRACT

A filler/synchronization word is used in the transmission of Huffman code. A procedure including assigning all ZEROS to a dummy word is used in assigning code words to source code to limit the number of ZEROS that naturally occur in any sequence of transmission code words. The filler/synchronization word then consists of: (1) a string of ZEROS having at least one more ZERO than the longest run which can occur in a sequence of the original source words; and (2) a terminating ONE. If it is desired to synchronize the receiver with the transmitter the filler/synchronization word is sent with a minimum number of ZEROS. If the transmitter runs out of data and filler is required, ZEROS are transmitted continuously until data is available for transmission at which time a ONE is inserted to terminate the train of filler ZEROS. The receiver ignores the filler ZEROS and is automatically synchronized to decode subsequent data once the inserted ONE is discarded.

7 Claims, 1 Drawing Figure

PATENTED DEC 4 1973 3,777,066
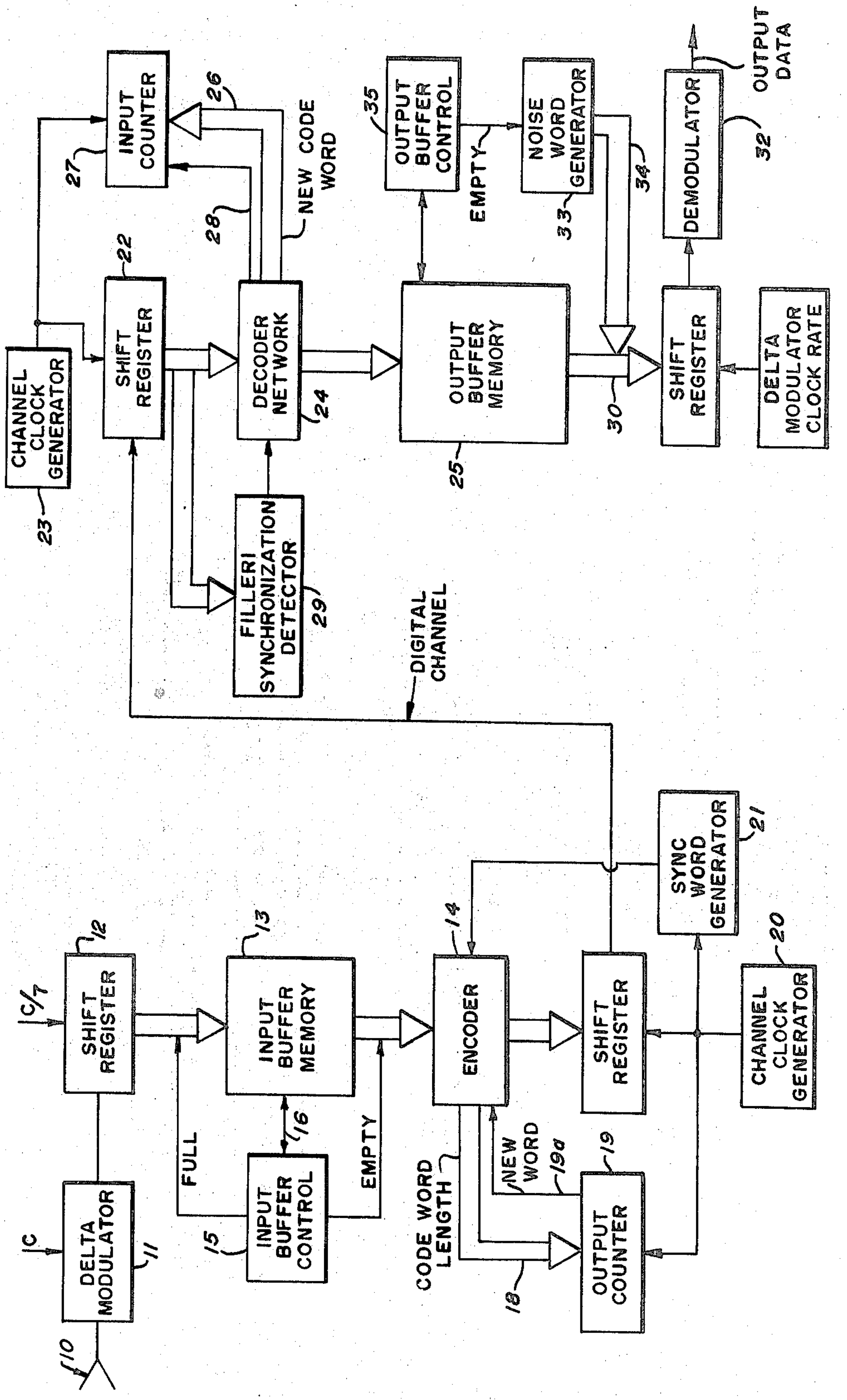

METHOD AND SYSTEM FOR SYNCHRONIZING THE TRANSMISSION OF DIGITAL DATA WHILE PROVIDING VARIABLE LENGTH FILLER CODE

BACKGROUND AND SUMMARY

The present invention relates to the transmission of digital data; and more particularly, it relates to the binary data transmission of statistical source codes. One way to transmit digital data is, of course, to directly transmit the incoming digital data as each digit occurs using a simple code which does not take into account the statistical properties of the source. This type of transmission requires a digital channel capable of handling the transmission at the incoming data rate. It is desirable from the point of view of economy to employ a digital channel having a bandwidth less than the incoming data rate. In this manner, more efficient use is made of the channel. The source might, of course, actually be the multiplexed combination of a plurality of individual sources all using a common digital channel.

One way to reduce the requirements on the digital transmission channel is to assign code words (sometimes referred to herein as "transmission code words") to the incoming data on a statistical basis, whereby a variable length code word is assigned to each source symbol or character and the code words are assigned depending upon the probability of occurrence of each source symbol or character. Thus, the shorter code words are assigned to those characters which occur most often. In general, the length of the code word assigned to each character increases as the probability of occurrence of that character decreases.

One such source code is known in the art as a Huffman code which was first presented by David A. Huffman. See "A Method of Construction of Minimum-Redundancy Codes," PROCEEDINGS OF THE IRE, Volume 40, Pages 1098–1101 (1952). Such codes are now well-known by those skilled in this art, and it will be presumed that the reader has familiarity with the function of Huffman codes and how they are generated. Huffman codes are known to be optimal for certain types of sources. Briefly, the symbols or characters must each be known to have a certain probability of occurrence, and they are thus listed. For binary codes, a tree is generated connecting pairs of symbols. After a pair of symbols is connected they are treated, for purposes of generating the rest of the tree as a new symbol with a probability of occurrence equal to the sum of the probabilities of the pair. The tree is built up by connecting at each step the pair of symbols or combined symbols having the lowest probabilites, and continuins until only a single combined branch with probability equal to one remains. The branches of the tree are then retraced to generate the code word for each of the original symbols. Additional tutorial information can be obtained from INFORMATION THEORY AND CODING, Abramson (McGraw-Hill, 1963).

The Huffman code takes source blocks or words of constant length and generates code words for transmission of unequal length but of minimum average length. One application which is more fully disclosed in my doctoral thesis entitled "Source Codes for the Output of a Delta Modulator Operating on Speech," Iowa State University, Ames, Iowa (1971) is to use a delta modulator to operate on an analog speech signal to generate source words of seven bits each. Speech samples were analyzed to determine the probability of occurrence of each of the possible 128 seventuple source words, and the corresponding Huffman code was generated. The Huffman code for the 128 source codes had transmission code words ranging in length from three to 12 bits with an average length of 5.549 bits. As compared with the seven bit source words, the lower average length for transmission words using the Huffman code is readily appreciated. To my knowledge, this application represents the first application of Huffman codes to a source for subsequent transmission and recovery in real time. During my investigations and research in real time transmission of statistical source codes such as the Huffman code, I discovered that two problems exist, and I refer to these as the filler problem and the synchronization problem. In its broader aspects, the present invention is directed to overcoming these two problems.

Consider a data source with the symbols A, B, C, and D. These symbols may be encoded as 00, 01, 10, and 11. Unless the source symbols are statistically independent, each with probability of occurrence 0.25, this code may be improved upon. Suppose that the true probabilities of occurrence are respectively 0.5, 0.25, 0.125, and 0.125. Then a Huffman code for this source is 1, 01, 001 and 000. This code is instantaneous, but not comma free, and in the case of statistical independence the efficiency is one. In any event only 1.75 bits per symbol are required to represent the source on the average using the Huffman code. Suppose that exactly 1.75 bits of channel capacity are provided in a constant rate channel for each source symbol and that the source rate is constant. If the first thousand symbols happen to be D, only the first 583 will have been transmitted by the time the one-thousandth D appears. Unless buffer storage has been provided for at least 417 source symbols ahead of the encoder, some will be lost.

If, on the other hand, the first one thousand symbols are A, another problem arises. The encoder, immediately after the first A is sent, is confronted with the problem of having no data to send. A constant rate binary channel cannot send "nothing," for that implies a ternary system. The present invention overcomes this problem by modifying the Huffman code to include a filler code word.

The first of the above mentioned problems is in fact worse because no finite amount of storage can insure that overflow will never occur. The source must be such that some data loss can be tolerated. It should be pointed out that if the constant rate source, constant rate channel restriction is relaxed these problems do not arise. For example, if the source is a teletypewriter and the buffer becomes full, the keyboard can be locked, stopping the data input until room can be made in the buffer.

The present invention is further concerned with a system in which the receiver is required to supply data for some use at a constant rate. If the source data is transmitted at a variable rate, it must come out of the decoder at a variable rate. Thus, buffer storage must also be provided at the receiver and that this output buffer might also overflow and underflow. No overflow of transmitted data need occur, but underflow is unavoidable and results in some error for a constant rate receiver. Once again if the less restrictive case of a teletypewriter system is used, the receiving teletypewriter would simply stop typing until data again become available, and no error would occur.

There is still one further problem inherent in systems of this type. "Source codes," which is the most convenient term, also are called "redundancy-reducing codes" and "noiseless codes." The term noiseless codes refers to the fact that in an error-free or noiseless channel any redundancy (which if structured properly can be used to detect or correct errors) is wasteful and should be eliminated. Thus, a noiseless code is a code for the noiseless channel. Any practical, physical "noiseless" channel will never be entirely error free. The effect of isolated errors must always be considered. The effect of any error on a Huffman coded message can be catastrophic failure. Huffman codes are words of varying numbers of bits and require correct decoding of each word in order to determine its length, and from that, the start of the next word. If decoding is not synchronous with transmission, decoding will be done in error. This synchronization problem may also occur when the channel is first established while trying to find the beginning of the first word.

The present invention has as a primary object a solution to the two above-mentioned problems requiring filler words or material to be supplied by the transmitter when the input buffer no longer has any data to encode and transmit, and synchronizing the receiver with the transmitter so as to avoid errors in detection. It is one of the principal advantages of the present invention that synchronization is achieved wherever filler is required and transmitted and that additional synchronization information may be sent periodically simply on the speculation that an error may have occurred. In addition, the filler "word" is a variable length sequence, the length depending upon the lapse of time between when the input buffer first runs out of data to be transmitted and when the next subsequent source character is ready to be encoded at the transmitter.

A filler/synchronization word is generated by first expanding the original source alphabet to include a "dummy" source symbol which is assigned a ZERO probability of occurrence. The expanded source is then encoded in the usual fashion and in the resulting code words the dummy symbol is assigned a code word, without loss of generality, consisting entirely of ZEROS. The code words for the original source symbols then each have at least a single ONE and the longest consecutive run of ZEROS which can occur (when any sequence of code words for the original symbols is transmitted) is bounded to some value which will be referred to as the longest natural run of ZEROS.

The filler/synchronization word is generated according to the rule that it has at least one more than the number of ZEROS that occurs in the longest natural run. A ONE is then added to these ZEROS to comprise the filler/synchronization word. Thus, the filler/synchronization word has a minimum total number of ZEROS. The actual value of the minimum depends in any given core on the particular source alphabet to be encoded, but it is always at least one more than the number of ZEROS that occur in the longest natural run.

When the transmitter senses that the input buffer has no more data for transmission, the transmitter inserts the filler/synchronization word which is transmitted through the channel. A continuous stream of ZEROS is transmitted until additional data is ready for transmission. Thus, the maximum number of ZEROS in the filler/synchronization word depends upon the lapse of time between the last transmitted character and the time when the next incoming character is ready for encoding and transmission.

When data is again ready for transmission, a ONE is inserted to terminate the train of filler ZEROS. The receiver, upon sensing the presence of a filler/synchronization word ignores the filler ZEROS and is automatically synchronized to decode subsequent data once the inserted ONE is discarded.

If it is desired to periodically synchronize the transmitter and receiver even though the transmitter has not run out of data for transmission, but on the assumption that an error may have occurred in the transmission channel, the filler/synchronization word is transmitted with the minimum number of ZEROS, as explained above, and a trailing ONE. This sequence will automatically synchronize transmitter and receiver.

Other features and advantages will be apparent to persons skilled in the art from the following detailed description of a preferred embodiment accompanied by the attached drawing.

THE DRAWING

The drawing is a functional block diagram of a system incorporating the present invention.

DETAILED DESCRIPTION

Turning then to the drawing, there is shown a functional block diagram of a system for the transmission of speech. The present invention is, of course, not limited to applications wherein speech is being transmitted, but my above-mentioned doctoral thesis was directed to this problem. The incoming speech signal is coupled to an input generally designated by reference numeral 10 and fed to a delta modulator 11 which generates an output stream of binary bits, each bit being capable of existing in only one of two voltage states (binary states). The delta modulator samples the incoming wave form at the clock rate C, and the state of each output bit is determined by whether the incoming analog voltage at one sampling time is respectively greater than or less than the incoming analog voltage at a previous sampling time.

The stream of bits emanating from the delta modulator 11 are coupled serially into a shift register 12 which, in this instance, is a seven-bit shift register. The groups of seven bits in the shift register 12 are transferred in parallel to an input buffer memory 13 at a rate equal to one-seventh of the clock rate C.

The input buffer memory transmits these data words to an encoder 14 if there are no other words stored in the input buffer memory 13 or, if there are other words stored in the input buffer memory 13 awaiting encoding, a queue is formed with the seven-bit words being encoded in the same order in which they are received from the delta modulator 11. The input buffer memory may also take any of a number of different forms, including core storage, and its operation is controlled by logic circuitry labeled input buffer control 15 which communicates with the input buffer memory 13 via line 16 to shift the seven-bit words to a forward position if that position is not occupied. The input buffer control circuitry also determines when the input buffer memory 13 is empty and, when it is full. If the input buffer memory is full, the words in the shift register 12 must be discarded. The input buffer control 15 contains conventional logic circuitry, the implementation of which is well within the skill of the art.

The encoder 14 removes the word from the input buffer memory 13 which is next to be transmitted and generates a pre-assigned Huffman code word for it. Again, table look-up techniques conventional in the art may be employed to encode the word into Huffman code.

In the simple example discussed previously wherein the source had an alphabet of A, B, C and D with probabilities of 0.5, 0.25, 0.125 and 0.125 respectively, the Huffman code words are 1, 01, 001, and 000. The present invention adds a fifth source symbol, the dummy, to the original four. The code word for the dummy is then assigned the all ZEROS code. This can always be done and doing it partially or wholly determines the particular patterns of ONES and ZEROS which must be assigned to the other source symbols. The dummy source symbol is designated as $f$ and is added to the source prior to encoding. The code word for $f$ may be used directly for filler alone and would not need to be all ZEROS. The all ZEROS restriction will yield the previously mentioned single filler/synchronization sequence which performs both functions and which will be discussed after a discussion of the probability to be assigned to $f$. Some probability must be arbitrarily assigned to $f$. If a high probability is assigned, then the filler code word will be short. If a low probability is assigned, it will be correspondingly long.

The purpose of the filler code word is to fill excess channel capacity, and if this were the only function to be served, it would make no difference if excess capacity is filled by sending a long filler word or a short filler word several times. On the other hand, the Huffman code achieves its efficiency by assigning high probability data to short code words. Maximum use of short code words represents the greatest efficiency, and the short code words are reserved for data. The dummy source symbol $f$ is, therefore, assigned probability ZERO and therefore is assigned the longest code word. For the simple source being discussed, the filler word $f$ is assigned a probability of ZERO and the total resulting Huffman code for A, B, C, D, and $f$ becomes 1, 01, 001, 001, and 0000. The addition of a filler word in this case increases the average code word length from 1.75 to 1.875 bits per data symbol, and this is a considerable increase. However, the available alphabet is very limited. The penalty becomes less severe as the size of the source increases. For example, for the system discussed in my doctoral thesis, the output of the delta modulator is treated as a source of 128 seventuples. As was shown in the thesis, the addition of a 129th word increased the average code word length by only about 0.005 per cent.

For this example, wherein the output bits of the delta modulator are grouped into words of seven bits, the encoder 14 generates a Huffman code word ranging in length from 3 to 13 bits. The word for the dummy source symbol, $f$, is 13 ZEROS. The Huffman code words are then transferred in parallel to a 13 bit shift register identified by reference numeral 17. The encoder 14 also generates a signal or set of signals along a bus 18 representative of the length of the Huffman code word transmitted to the shift register 17. The length code is transmitted to an output counter 19, and it is decremented by the channel clock so that when its count reaches ZERO, a signal is transmitted along line 20 back to the encoder 14 to signal the encoder 14 that the shift register is empty and prepared to receive a new Huffman code word.

The Huffman code word that is transmitted to the shift register 17 is right-justified, and the channel clock shifts the bits from the register 17 according to the channel clock rate into the digital channel for transmission to the receiver. The output number in counter 19 is decremented by ONE on each such shift; and it transfers a new code word into the shift register 17 from the encoder 14 together with a new code word length along bus 18 when the counter 19 reaches ZERO. If no data word is available in the buffer memory 13, then the encoder 14 supplies the filler code word. If only the filler function is to be implemented, this word is only the word for (—i.e., 13 ZEROS. In practical systems, synchronization is also required and a filler/synchronization word is used instead.

As has already been mentioned, the filler/synchronization word is composed of one more than the maximum number of ZEROS than can occur naturally during the transmission of any two symbols from the possible set of symbols being transmitted, (the longest natural run of ZEROS), plus a ONE at the trailing end. If $n$ is the length of the longest code word, which is always the word corresponding to the dummy synbol $f$, then a run of $2n-2$ ZEROS is the longest run which could naturally occur for any source or assignment procedure in which $f$ is assigned the all ZEROS code. An examination of most sources and astute assignment of ONES and ZEROS within the constraints of the Huffman tree will reduce this number in most cases. Hence, a filler/synchronization sequence which will work for the problem at hand is twenty-four ZEROS followed by a ONE. It will be appreciated that the dummy symbol $f$ is never actually sent, but rather is a device to limit the longest natural run of ZEROS that can occur.

In a preferred mode, only the 24 ZEROS are initially transferred from the encoder 14 to the output shift register 17, and the final ONE is not inserted unless a data word appears in the input buffer memory 13 as detected by the input buffer control 15. That is, if the input buffer control 15 senses that the input data memory is empty even after the 24 ZEROS have been transmitted, then a second block of ZEROS, perhaps smaller (for example, five), may be transmitted from the encoder 14 to the output shift register 13. This sequence may continue indefinitely unitl there is data to be transmitted. In this manner, the filler/synchronization word is a word of variable length, comprising a plurality of ZEROS including one more than the number of ZEROS in the longest natural run, but ranging in length to an indefinite number of ZEROS. When the input buffer control 15 senses that there is data in the input buffer memory 13 ready for encoding, it signals the encoder 14 to terminate the filler/synchronization word by inserting a terminating ONE at the end of the string of ZEROS.

As has already been mentioned, it is also important to provide a capability of re-synchronizing the receiver periodically on the assumption that the failure may have occurred. Toward this end, a sync word generator 21, which may simply be a countdown network, is energized by the channel clock 20 to generate an output signal which is transmitted to the encoder 14 periodically. The output of the sync word generator 21 may occur, for example, every 100 milliseconds, at which time, the encoder 14 inserts the synchronization/filler word with a minimum number of ZEROS into the shift register 17 for transmission.

Turning now to the receiver, the binary words transmitted through the digital channel enter a 24-bit shift register 22, and the bits are shifted sequentially by means of a channel clock 23 which is synchronized with the channel clock in the transmitter. When the first bit of an incoming code word reaches the right end of the shift register 22, the word is decoded by means of a decoder network 24, and the resulting seven-bit data word is placed in another first-in first-out queue called the output buffer 25. The decoder network also transmits signals along a bus 26 into an input counter 27 which signals are representative of the length of the incoming decoded word. The input counter 27 is incremented by the signals fed along the bus 26 and decremented by the channel clock 23 upon each shift of data, whereby when it reaches a ZERO count, a signal is transmitted back along a line 28 indicating to the decoder network 24 that a previously decoded word has been shifted out of the shift register 22 and the next word is right-justified in the input shift register 22 and ready to be decoded. The output buffer 25 will never overflow provided it is capable of storing the same number of words as the input buffer 13. That is, there will always be space for the decoded data.

When the transmitter is transmitting filler/synchronization data, a filler/synchronization detector 29 senses this and generates a signal transmitted to the decoder network 24 which instructs it not to decode information in the register 22. The filler/synchronization detector 29 may simply be a diode detector designed to indicate whether a ONE is present in any bit in the shift register 22. If no ONE is present, then a variable length filler/synchronization word is being received. If the detector 29 detects that all 24 bits are ZEROS, then it inhibits the decoder network 24 until a ONE (which will be the ONE terminating the filler/synchronization word) has been shifted to the rightmost location and then one more, whereby the following input word will be right-justified in the input register 22 and ready to be decoded.

It will be observed that transmission of the filler/synchronization sequence not only re-synchronizes the receiver if an error had previously occurred, but further, the transmission of the filler/synchronization sequence produces no error if it is transmitted when it is not needed. It is simply ignored by the receiver. This is important because the transmitter has no way in which to determine whether a previous synchronization failure may have occurred.

The seven-bit words from the output buffer memory 25 are transmitted along a parallel bus 30 to an output shift register 31 which is shifted by the delta modulator clock into the input of a conventional delta demodulator 32. As has already been mentioned, if the input buffer memory 13 overflows, loss of data will result. This data loss will cause the output buffer memory 25 to underflow at some future time, and a number of data words equal to the number lost must be generated at the decoder. For the application discussed in my thesis, that is, delta modulated speech, the inserted filler is alternately 0101010 and 1010101. This filler output data is generated by a noise word generator 33 and transmitted via parallel bus 34 to the output shift register 31, which, as mentioned, is a seven-bit shift register. The noise word generator 33 is controlled by an output buffer control network 35 which the output the shifting of the memory words to theoutput shift register 31, and also senses when the output buffer memory 25 does not contain any data to thereby actuate the noise word generator 33.

It is clear from the above discussion that if the system did not periodically synchronize the receiver with the transmitter, and an error should occur in the channel, the decoder may not only decode an erroneous seven-bit data word, but it will also falsely determine the length of the word being decoded. Thus, the beginning of the next code word will be incorrectly located, and a continuing failure will result due to loss of receiver synchronization. By periodically sending a filler/synchronization code word of minimum length, if desired, this problem is overcome. Moreover, initial synchronization may be established when the channel is first energized simply by preceding any data with a filler/synchronization word. Even though for purposes of explanation the application of the present invention to the transmission of delta modulated speech has been mentioned a number of times, the invention, in its broader aspects, will be realized to have much wider application.

For example, the teletypewriter system previously mentioned was cited as an example of a system in which the source could be locked up or halted and the receiver could stop for lack of data without error. The overflow and underflow problems discussed with respect to the speech application do not occur in the teletypewriter system.

In the foregoing description, it will be appreciated that the assignment of the logic symbol ONE or ZERO to binary voltages is arbitrary, so that they are interchangeable.

Having thus described in detail a preferred embodiment of the inventive system and method, persons skilled in the art will be able to modify certain of the structure and steps which have been disclosed and to substitute equivalent elements for those illustrated while continuing to practice the invention; and it is, therefore, intended that all such modifications and substitutions be covered as they are embraced within the spirit and scope of the appended claims.

I claim:

1. A system for transmitting statistical source code signals wherein first sets of signals comprising input words of equal numbers of bits are associated with corresponding sets of second signals comprising transmission code words of unequal numbers of bits based upon the probability of occurrence of the input words and all transmission words include at least one ONE, comprising: input buffer memory means for storing said input words; fixed length to variable length encoder means for encoding the input words in said buffer memory means into corresponding transmission words; output means receiving transmission words from said encoding means for coupling said transmission words to a data channel; circuit means responsive to the presence of input words in said input buffer means for signalling said encoder means to generate filler/synchronziation word signals having a plurality of consecutive ZEROS including at least one more ZERO than the longest run of consecutive ZEROS that can occur with any combination of two transmission words, followed by a ONE, said encoder transmitting said filler/synchronization word signals when the said input buffer means contains no more input words.

2. The system of claim 1 further comprising a receiver receiving the transmission words and including: an input shift register receiving said transmission words; decoder network means responsive to the contents of said shift register for decoding said transmission words back into the original source words; and a filler/synchronization detector responsive to the contents of said shift register for controlling said decoder network means to discontinue generating output source words when said filler/synchronization word is detected in said input shift register of said receiver.

3. The system of claim 1 wherein said circuit means further comprises means for generating said filler/synchronization word having an indefinite number of ZEROS with a minimum at least one more than the longest run of ZEROS that can occur with any combination of two transmittable input words, the maximum number of ZEROS thereof being indefinite and dependent upon the reception of additional input words for encoding, said circuit means terminating each filler/synchronization sequence with a ONE.

4. The system of claim 1 wherein said statistical source code is a Huffman code which includes a dummy word assigned the all ZEROS sequence whereby all transmittable words have at least one ONE to thereby limit the number of ZEROS in the longest run of consecutive ZEROS for any combination of transmittable words.

5. The system of claim 1 further comprising synchronization word generator means for controlling said encoder means to generate said filler/synchronization word to re-synchronize a receiver with the transmitter.

6. In a system for transmitting statistical source code wherein input words of equal length are assigned transmission code words of unequal length based upon the probability of occurrence of the input words and all transmittable code words contain at least one ONE, the combination comprising: transmitter means including an input buffer memory means for storing said input words as they occur; fixed length to variable length encoder means for encoding the words in said input buffer memory means into transmission words according to the assigned code; output means receiving transmission words from said encoding means for coupling said transmission words to a data channel; circuit means responsive to the presence of said input words and said input buffer means for signalling said encoder means to generate a filler/synchronization word having a plurality of ZEROS including at least one more ZERO than the maximum run of ZEROS that can occur with any combination of two transmittable input words, followed by a ONE, whereby said filler/synchronization word is transmitted when said input buffer means contains no more input words; receiver means receiving the code transmitted through said data channel and including input register means for temporarily storing said transmitted code; decoder network means in synchronization with the received data for decoding the transmission words in said input register means to generate output words of length equal to said source words; and filler/synchronization detector means for sensing the presence of said filler/synchronization word in said input register means to inhibit the operation of said decoder means when the same is sensed and to re-synchronize said decoder means upon the occurrance of subsequent transmission words.

7. A method for transmitting statistical source code signals wherein signals comprising input words of equal numbers of bits are associated with signals comprising transmission code words of unequal numbers of bits based upon the probability of occurrence of the input words, the steps comprising: converting said equal length input words into variable length transmission words such that all transmission words include at least one binary ONE signal; generating signals comprising a filler/synchronization word sequence having a variable bit length including a minimum number of consecutive ZEROS equal to at least one more than the longest run of consecutive ZEROS that can occur in any combination of transmission words, followed by a ONE, the maximum number of ZEROS being determined by the amount of filler sequence needed in encoding and transmitting said input words; transmitting said filler/synchronization word sequence when the transmitter is out of data to transmit; terminating said filler/synchronization sequence with a ONE signal when additional input words appear for encoding; and resynchronizing said receiver with said transmitter upon the termination of said filler/synchronization sequence.

* * * * *

US003777066B1

REEXAMINATION CERTIFICATE (2960th)

United States Patent [19]

Nicholas

[11] B1 3,777,066

[45] Certificate Issued Jul. 30, 1996

[54] METHOD AND SYSTEM FOR SYNCHRONIZING THE TRANSMISSION OF DIGITAL DATA WHILE PROVIDING VARIABLE LENGTH FILLER CODE

[75] Inventor: David C. Nicholas, Cedar Rapids, Iowa

[73] Assignee: Iowa State University Research Foundation, Ames, Iowa

Reexamination Requests:

No. 90/003,295, Dec. 23, 1993
No. 90/003,616, Oct. 27, 1994
No. 90/003,951, Sep. 6, 1995

Reexamination Certificate for:

| | |
|---|---|
| Patent No.: | **3,777,066** |
| Issued: | **Dec. 4, 1973** |
| Appl. No.: | **217,612** |
| Filed: | **Jan. 13, 1972** |

[51] Int. Cl.$^6$ .................................................. H04L 7/00

[52] U.S. Cl. ........................................ 375/365; 375/363

[56] References Cited

PUBLICATIONS

"Buffer Overflow in Variable Length Coding of Fixed Rate Sources," Frederick Jelinek, *IEEE Transactions on Information Theory*, May 1968, pp. 490–501.

"Digital television: shrinking bulky bandwidths," J. M. Knight, et al., *Electronics*, Dec. 14, 1964, pp. 77–84.

*Primary Examiner*—Stephen Chin

[57] ABSTRACT

A filler/synchronization word is used in the transmission of Huffman code. A procedure including assigning all ZEROS to a dummy word is used in assigning code words to source code to limit the number of ZEROS that naturally occur in any sequence of transmission code words. The filler/synchronization word then consists of: (1) a string of ZEROS having at least one more ZERO than the longest run which can occur in a sequence of the original source words: and (2) a terminating ONE. If it is desired to synchronize the receiver with the transmitter the filler/synchronization word is sent with a minimum number of ZEROS. If the transmitter runs out of data and filler is required, ZEROS are transmitted continuously until data is available for transmission at which time a ONE is inserted to terminate the train of filler ZEROS. The receiver ignores the filler ZEROS and is automatically synchronized to decode subsequent data once the inserted ONE is discarded.

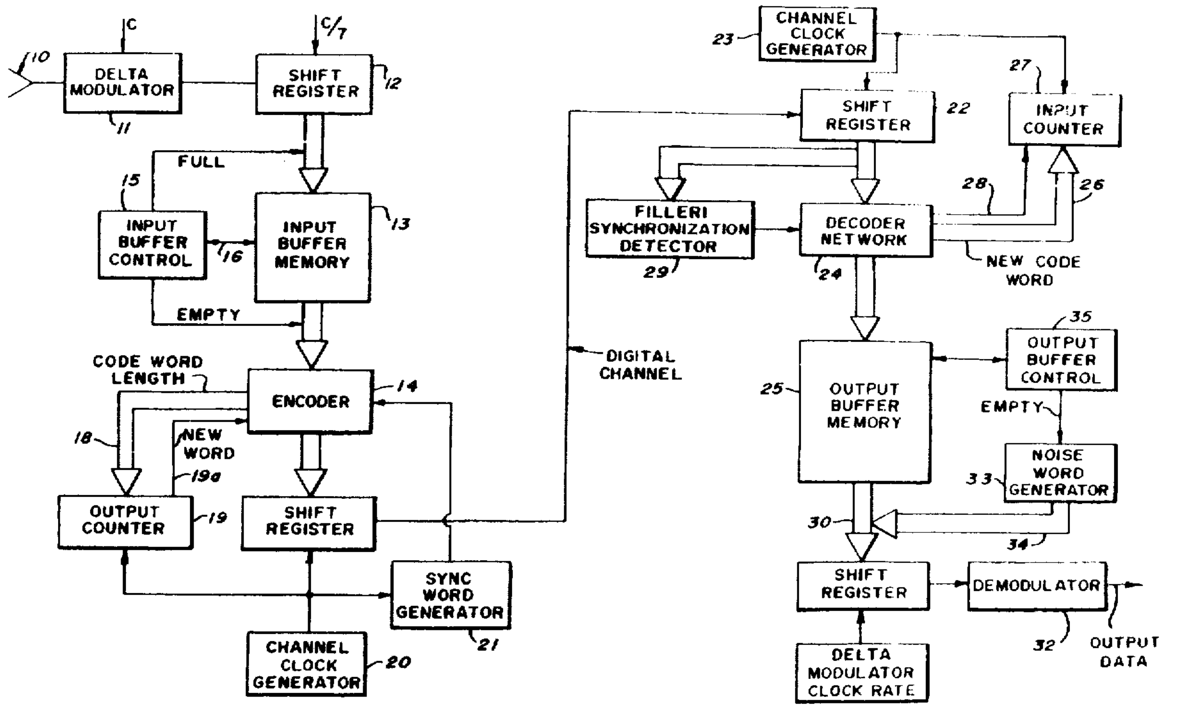

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–7 is confirmed.

* * * * *